United States Patent
Marantz et al.

(10) Patent No.: US 9,747,377 B2
(45) Date of Patent: *Aug. 29, 2017

(54) SEMANTIC ZOOM FOR RELATED CONTENT

(71) Applicant: Microsoft Technology Licensing, LLC, Redmond, WA (US)

(72) Inventors: Daniel Marantz, Bellevue, WA (US); Aaron C. Yuen, Bellvue, WA (US); Priya Vaidyanathan, Clyde Hill, WA (US); Mark Blelock Atherton, Lymington (GB); Parthasarathy Govindarajen, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/211,705

(22) Filed: Jul. 15, 2016

(65) Prior Publication Data

US 2016/0321371 A1 Nov. 3, 2016

Related U.S. Application Data

(63) Continuation of application No. 14/676,102, filed on Apr. 1, 2015, now Pat. No. 9,396,267, which is a
(Continued)

(51) Int. Cl.
*H04N 9/80* (2006.01)
*G06F 17/30* (2006.01)
(Continued)

(52) U.S. Cl.
CPC .... *G06F 17/30867* (2013.01); *G06F 3/04845* (2013.01); *G06F 3/04883* (2013.01);
(Continued)

(58) Field of Classification Search
CPC ......... G06F 17/39672; G06F 17/30032; G06F 17/3084; G06F 17/30864; G06F 3/048
See application file for complete search history.

(56) References Cited

U.S. PATENT DOCUMENTS

| 7,747,639 | B2 | 6/2010 | Kasperski |
| 8,365,059 | B2 | 1/2013 | Walsh et al. |

(Continued)

OTHER PUBLICATIONS

Lau, Felix and Hok Kan, "A New Mobile Search Engine Interface", COMP390C-Directed Studies III (Honors Study Track) Final Report, May 17, 2010, reprinted from the Internet at: https://www.google.com/search?sourceid=navclient&aq= &oq=COMP390C+directed+studies+III+Final+Report&ie=UTF-8 &rlz=1T4ADRA_enUS455US456 &q=COMP390C+directed+studies+III+Final+Report&gs_l=hp.... 0.0.0.12687..........0.QywuFoB4cns 18 pgs.
(Continued)

*Primary Examiner* — Huy T Nguyen
(74) *Attorney, Agent, or Firm* — Merchant & Gould, P.C.

(57) ABSTRACT

Among other things, one or more techniques and/or systems are provided for displaying a related content view within a search interface. That is, a search interface, such as a search application, may provide search results that are relevant to a query submitted through the search interface. For example, a main search engine results view comprising one or more search results of the query may be presented within the search interface. Responsive to a semantic zoom operation (e.g., a touch gesture), the search interface may be transitioned from the main search engine results view to a related content view comprising related content that corresponds to the query and/or a (e.g., supplemental) search result for the query. In this way, the user may explore supplemental content, such as query suggestions, images, entity descrip-
(Continued)

tions/profiles, videos, and/or other content, that may be related to a query submitted by the user.

20 Claims, 10 Drawing Sheets

Related U.S. Application Data continuation of application No. 13/632,599, filed on Oct. 1, 2012, now Pat. No. 9,002,174.

(51) Int. Cl.
*G06F 3/048* (2013.01)
*G06F 3/0484* (2013.01)
*G06F 3/0488* (2013.01)

(52) U.S. Cl.
CPC .... *G06F 17/30032* (2013.01); *G06F 17/3084* (2013.01); *G06F 17/30554* (2013.01); *G06F 17/30672* (2013.01); *G06F 17/30864* (2013.01); *G06F 3/048* (2013.01)

(56) References Cited

U.S. PATENT DOCUMENTS

| 9,002,174 B2* | 4/2015 | Marantz ............ G06F 17/30672 386/241 |
|---|---|---|
| 9,396,267 B2* | 7/2016 | Marantz ............ G06F 17/30672 |
| 2004/0249795 A1 | 12/2004 | Brockway |
| 2005/0036067 A1 | 2/2005 | Ryal et al. |
| 2007/0168413 A1 | 7/2007 | Barletta et al. |
| 2007/0192739 A1 | 8/2007 | Hunleth et al. |
| 2007/0226189 A1 | 9/2007 | Piekos et al. |
| 2008/0060020 A1 | 3/2008 | Kelts |
| 2010/0145710 A1 | 6/2010 | Tremblay |
| 2011/0035403 A1 | 2/2011 | Ismalon |
| 2012/0136886 A1 | 5/2012 | Brewer |
| 2012/0197857 A1 | 8/2012 | Huang et al. |
| 2013/0097133 A1 | 4/2013 | Grandhi et al. |

OTHER PUBLICATIONS

Branscombe, Mary. "Windows 8 Review", http://www.techradar.com/reviews/pc-mac/software/operating-systems/windows-8-1093002/review?artc_pg=5, Retrieved Date: Sep. 18, 2012, pp. 1-26.

Miller, Miranda. "Google Launches Knowledge Graph, First Step in Next Generation Search," http://searchenginewatch.com/article/217583/Google-Launches-Knowledge-Graph-First-Step-in-Next-Generation-Search, Published Date: May 17, 2012, pp. 1-5.

LeClair, Dave. "Google+ Local App Launches on iPhone With Zagat Ratings and Voice Search", http://www.makeuseof.com/tag/google-local-app-lanuches-iphone-zagat-ratings-voice-search-updates/, Published Date: Jun. 4, 2012, pp. 1-9.

Tuan, Luu Anh, et al. "Automatic Suggestion for PubMed Query Reformulation," In Journal of Computing Science and Engineering, vol. 6, No. 2, http://jcse.kiise.org/files/V6N2-08.pdf, Published Date: Jun. 2012. pp. 1-7.

PCT Application No. PCT/US2013/060186, International Search Report mailed Dec. 3, 2013, 10 pages.

U.S. Appl. No. 13/632,599, Non-Final Rejection mailed Dec. 9, 2013, 12 pages.

U.S. Appl. No. 13/632,599, Amendment and Response filed Mar. 10, 2014, 15 pages.

U.S. Appl. No. 13/632,599, Final Rejection mailed May 30, 2014, 15 pages.

U.S. Appl. No. 13/632,599, Amendment and Response Sep. 2, 2014, 18 pages.

U.S. Appl. No. 13/632,599, Notice of Allowance mailed Nov. 28, 2014, 5 pages.

U.S. Appl. No. 14/676,102, Office Action mailed Nov. 2, 2015, 7 pgs.

U.S. Appl. No. 14/676,102, Amendment and Response filed Feb. 2, 2016, 8 pgs.

U.S. Appl. No. 14/676,102, Notice of Allowance mailed Mar. 15, 2016, 5 pgs.

U.S. Appl. No. 14/676,102, Amendment after Allowance filed Apr. 26, 2016, 3 pgs.

U.S. Appl. No. 14/676,102, USPTO Response mailed May 6, 2016, 2 pgs.

PCT Internation Preliminary Report on Patentability in Application PCT/US2013/060186, mailed Apr. 7, 2015, 5 pgs.

* cited by examiner

SEMANTIC ZOOM FOR RELATED CONTENT

RELATED APPLICATION

This application is a continuation of and claims priority to U.S. application Ser. No. 14/676,102, filed Apr. 1, 2015, now U.S. Pat. No. 9,396,267, which application is a continuation of U.S. application Ser. No. 13/632,599, filed Oct. 1, 2012, now U.S. Pat. No. 9,002,174, entitled "SEMANTIC ZOOM FOR RELATED CONTENT", at least some of which may be incorporated herein.

BACKGROUND

Many users may discover and interact with content through a search interface, such as a search website or a search application. In one example, a user may utilize a web browser to search for websites, images, videos, and/or other content by submitting a search query into a search engine. The search engine may provide a search results page comprising one or more search results that are relevant to the search query. Displaying the search results page on a mobile device, such as a tablet or a mobile phone, may result in a diminished user experience because merely a few search results may be displayed, and supplemental content may be left out of the search results page.

SUMMARY

This summary is provided to introduce a selection of concepts in a simplified form that are further described below in the detailed description. This Summary is not intended to identify key factors or essential features of the claimed subject matter, nor is it intended to be used to limit the scope of the claimed subject matter.

Among other things, one or more systems and/or techniques for displaying a related content view are provided herein. That is, a search interface, such as a search application or a search website, may provide search results based upon a query submitted through the search interface. In particular, responsive to receiving a query through the search interface, a set of search results corresponding to the query may be obtained. For example, a set of web pages that are relevant to a query "Ohio sports" may be obtained as the set of search results. At least a portion of the set of search results may be displayed within a main search engine results view of the search interface. The portion of the set of search results may comprise all or less than all of the search results within the set of search results. In one example, because the set of search results may comprise a relatively large number of search results that may not fit within a single view of the search interface, the portion of search results may comprise less than all of the search results within the set of search results.

A set of related content corresponding to the query and/or a search result within the set of search results may be obtained. The set of related content may comprise a variety of content, such as suggested queries (e.g., a narrowing query "Ohio soccer sports", a broadening query "U.S. sports", a related query "running trails in Ohio", etc.), images (e.g., a logo of an Ohio sports team), videos (e.g., a news video of a new stadium being built), a link to an application (e.g., a shortcut to a sports news reading application), a map or map directions (e.g., a map of running trails or stadiums in Ohio), and/or a plethora of other types of content. Related content from the set of related content may be populated within a related content view, and the related content view may be displayed within the search interface based upon a semantic zoom command (e.g., user input mapped to a command that transitions the search interface from the main search engine results view to a related content view). It may be appreciated that a variety of techniques may be employed to make the set of related content accessible to the search interface for population of the related content view. In one example, at least some of the set of related content may be obtained before (e.g., "pre-fetched") an occurrence of the semantic zoom command that would trigger display of at least some of the set of related content (e.g., contemporaneously with obtaining the set of search results). If the set of related content is pre-fetched, then the set of related content may be locally cached or stored as a hidden object within the main search engine results view. In another example, at least some of the set of related content may be obtained (e.g., "in real-time" and/or after the set of search results are obtained) after the occurrence of the semantic zoom command.

The search interface may be configured to receive the semantic zoom command associated with the main search engine results view. The semantic zoom command may correspond to a variety of input, such as a mouse input, a keyboard input, a touch event, a swipe gesture, a spoken command, a hand gesture, and/or other forms of input. Responsive to receiving the semantic zoom command associated with the main search engine results view, the search interface may be transitioned from the main search engine results view to the related content view comprising a first portion of the set of related content. The first portion of the set of related content may comprise all or less than all of the related content within the set of related content. In this way, the user may interact with related content provided through the related content view. In one example, the user may pan from the first portion to a second portion of the set of related content. In another example, the user may filter or sort the set of related content (e.g., sort based upon the type of content; filter based upon keywords, etc.). In another example, responsive to a user selection of related content, functionality associated with the related content may be invoked (e.g., a video may be played, an application may be executed, a web page may be displayed, a new query may be executed, map directions may be displayed, coupons may be displayed, etc.).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
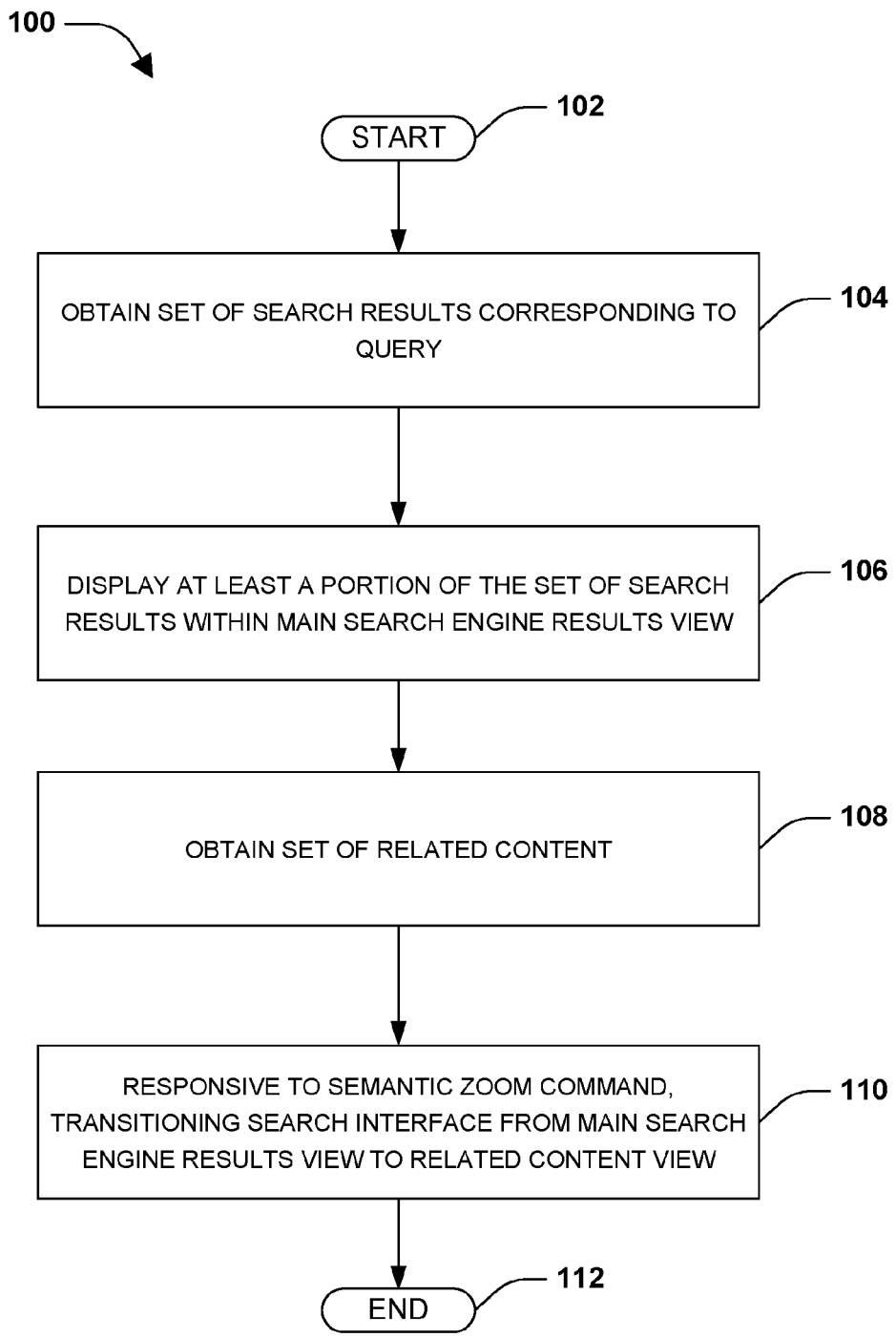
FIG. 1 is a flow diagram illustrating an exemplary method of displaying a related content view.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many users may utilize a search interface to discover content relevant to a search task, such as researching a car purchase, planning a vacation, or locating interesting content associated with a favorite sports team, for example. While performing the search task, the user may submit a query through the search interface to obtain query results. Based upon the query results returned by the search interface, the user may refine the query to create a new query (e.g., because the user may not have obtained sufficient information to accomplish the search task based upon the search results of the query). In this way, the user may iteratively submit queries, evaluate query results, and submit refined queries in order to accomplish the search task. In addition to providing query results, providing the user with related content (e.g., images, links to applications, videos, query suggestions, and/or other content related to a query and/or a query result) may aid the user in accomplishing the search task. Unfortunately, many users may interact with the search interface through a device comprising relatively limited screen space, such as a touch device, a mobile device, a tablet device, etc. Displaying query results and related content within a search results page may clutter the search results page. Accordingly, as provided herein, it may be advantageous to provide the user with related content through the search interface in a user friendly format that presents the related content in an intuitive and/or easy-to-read format.

One embodiment of displaying a related content view is illustrated by exemplary method 100 in FIG. 1. At 102, the method starts. A query (e.g., "concerts in Las Vegas") may be received through a search interface, such as a search application. At 104, a set of search results corresponding to the query may be received. For example, links to websites, articles, images, videos, and/or other content relevant to the query may be retrieved by a search engine as the set of search results. At 106, at least a portion of the set of search results may be displayed within a main search engine results view of the search interface.

At 108, a set of related content corresponding to the query and/or a search result within the set of search results may be obtained. In one example, one or more query suggestions, such as broadening queries, narrowing queries, related queries, and/or side-ways queries, may be obtained as the set of related content. In another example, one or more images, videos, map directions, coupons, text, application shortcuts, website links, a description of an entity (e.g., a location, a person, a business, an object, an idea, etc.) and/or a variety of other content may be obtained as the set of related content. It may be appreciated that a variety of techniques may be employed to make the set of related content accessible to the search interface for population of a related content view. In one example, the set of related content may be obtained before an occurrence of a semantic zoom command that would trigger display of related content (e.g., user input, associated with the main search engine results view, that is mapped to a command that transitions the search interface from the main search engine results view to the related content view), such that the set of related content may be locally cached, stored as a hidden object within the main search engine results view, and/or otherwise not be visible until subsequently called in some manner. In another example, the set of related content may be obtained after the occurrence of the semantic zoom command. In another example, the set of related content may be obtained asynchronously after the main search engine results view has been populated with search results, but before the occurrence of a semantic zoom command.

At 110, responsive to receiving a semantic zoom command (e.g., a pinch gesture on a touch screen, a mouse click, a keyboard input, a swipe gesture, a touch event, etc.) associated with the main search engine results view, the search interface may be transitioned from the main search engine results view to a related content view comprising a first portion of the set of related content. It is to be appreciated that, unless indicated otherwise, "first", "second", "third", etc. and/or the like, are merely used herein as identifiers rather than to imply an ordering, temporal aspect, etc. The first portion of the set of related content may thus comprise a middle portion, intermediary portion, end portion, etc. of the related content within the set of related content (e.g., is not limited to a beginning portion). In one example, a second set of related content corresponding to the query and/or a search result within the set of search results may be obtained, and a first portion of the second set of related content may be displayed within the related content view where the portions represent different types of related content or unique content. For example, the set of related content may comprise a first type of related content, such as one or more narrowing search queries, while the second set of related content may comprise a different type of related content, such as one or more broadening queries, side-ways queries, and/or related queries. In this way, various types of related content may be organized, grouped, and/or displayed within the related content view. In one example of displaying the first portion of the set of related content, a first related content may comprise a narrowing query comprising one or more terms of the query (e.g., the initial query submitted by the user "concerts in Las Vegas") and/or one or more suggested query terms (e.g., "at the New Hotel"), where the one or more suggested query terms are formatted differently than the one or more terms of the query. For example, the first related content may comprise "concerts in Las Vegas" in a non-bold format and "at the New Hotel" may be in a bold format and/or an enlarged font. In one example of implementing the related content view, the related content view may be implemented as a metaphor associated with the search interface. That is, the search interface may be implemented as an interface metaphor comprising a set of user interface visual metaphors, such as the main search engine results view and/or the related content view.

One or more commands, such as a one-touch command, may be associated with the related content view. In one example of a command, responsive to receiving a pan command, the first portion of the set of related content may be replaced with a second portion of the set of related content within the related content view. In this way, a user may pan (e.g., scroll) through various portions of related content to explore the set of related content. In another example of a command, responsive to receiving a user selection of related content comprising a related query (e.g., a query suggestion), a second query may be performed based upon the related query to obtain a set of related search results. The related content view and/or the main search engine results view may be updated with at least a portion of the set of related search results. In another example of a command, responsive to receiving a back command, the search interface may be transitioned from the related content view back to the main search engine results view. In another example of a command, the first portion of the set of related content may be filtered based upon a filter criterion associated with a filter command, or may be sorted based upon a sort criterion associated with a sort command (e.g., the filter criterion and/or the sort criterion may correspond to a variety of criteria, such as filter/sort by content type, filter/sort by keywords, filter/sort by data, etc.). It may be appreciated that other commands may be implemented, such as a play video command for related video content, a view map command for related map content, a view image command for related image content, an execute application command for a related application, an execute related query command for a related query, a navigate to source of content command for related content, etc. At 112, the method ends.

Figure 2:
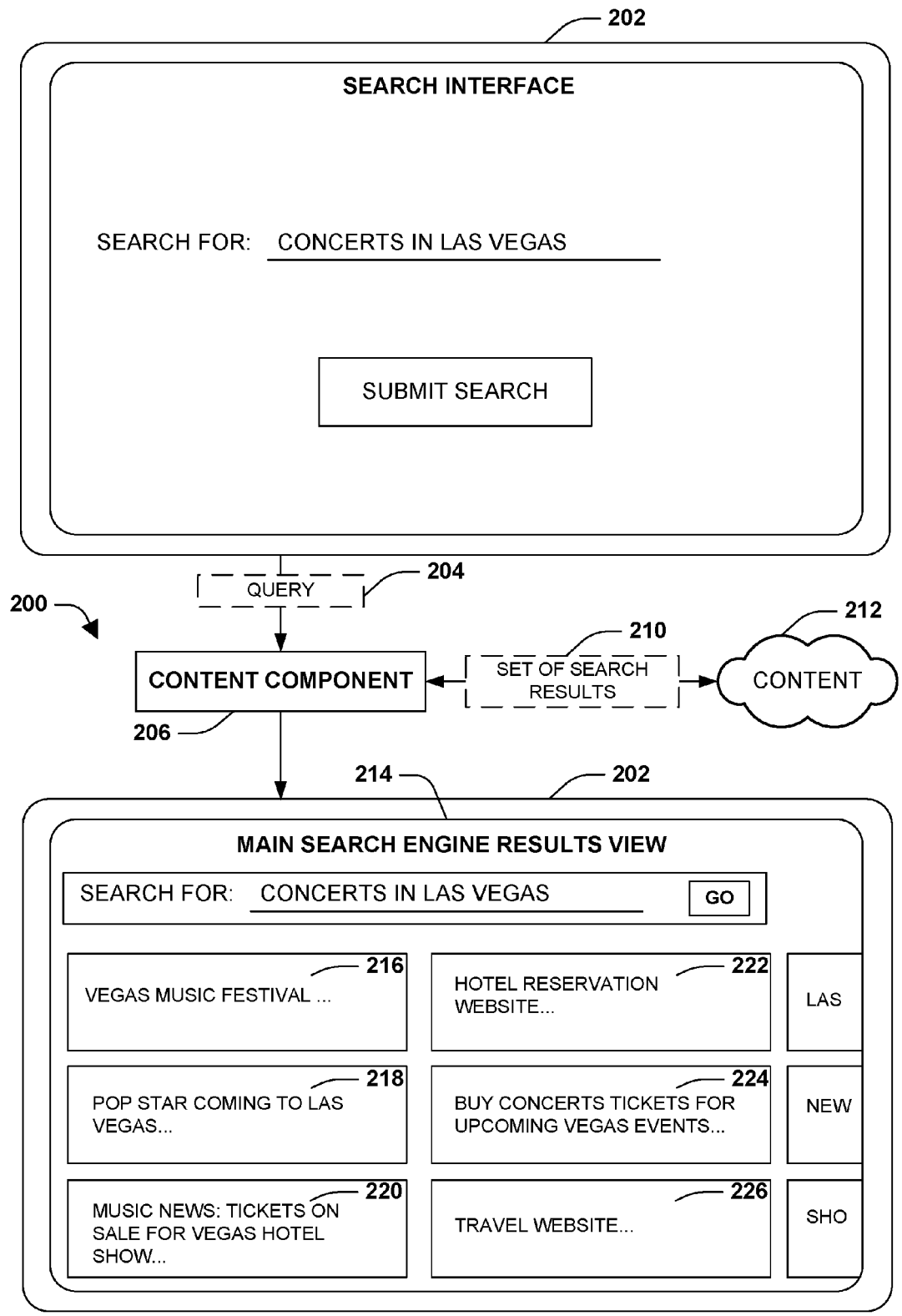
FIG. 2 is a component block diagram illustrating an exemplary system for displaying a main search engine results view within a search interface.

FIG. 2 illustrates an example of a system 200 configured for displaying a main search engine results view 214 within a search interface 202. The system 200 comprises a content component 206. The content component 206 is configured to receive a query 204 submitted through the search interface 202. For example, while researching things to do during an upcoming vacation to Las Vegas, a user may submit the query 204 for "concerts in Las Vegas". The content component 206 may obtain a set of search results 210 that are relevant to the query 204 from various content sources 212 (e.g., search engine, etc.). The content component 206 may be configured to display at least a portion of the set of search results 210 within the main search engine results view 214. For example, the content component 206 may display a first search result 216 (e.g., a search result corresponding to a Vegas music festival website), a second search result 218 (e.g., a search result corresponding to news article about a pop star coming to Las Vegas), a third search result 220 (e.g., a search result corresponding to a music news blog), a fourth search result 222 (e.g., a search result corresponding to a hotel reservation website), a fifth search result 224 (e.g., a search result corresponding to a concert purchasing website), sixth search result 226 (e.g., a search result corresponding to a travel website) and/or additional search result(s). In this way, the user may view and/or explore various search results through the main search engine results view 214 of the search interface 202.

Figure 3:
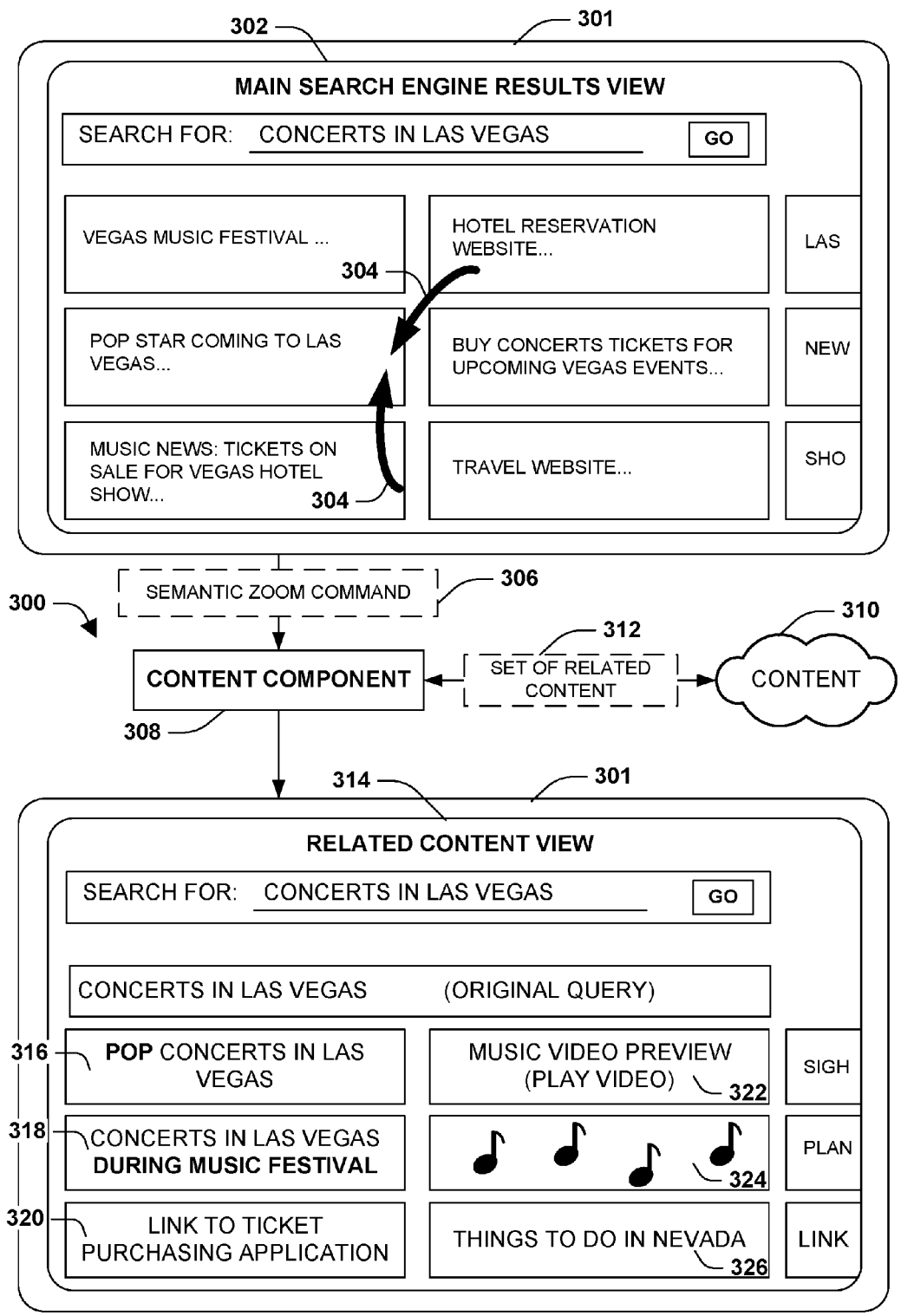
FIG. 3 is a component block diagram illustrating an exemplary system for displaying a related content view within a search interface.

FIG. 3 illustrates an example of a system 300 configured for displaying a related content view 314 within a search interface 301. The system 300 may comprise a content component 308. The content component 308 may be associated with the search interface 301 (e.g., a search application). A main search engine results view 302 may be displayed within the search interface 301 based upon a query "concerts in Las Vegas" submitted by a user of the search interface. For example, the main search engine results view 302 may correspond to the main search engine results view 214 of FIG. 2. A semantic zoom command 306 associated with the main search engine results view 302 may be detected by the content component 308. For example, the user may pinch 304 a screen of a touch device hosting the search interface 301 to initiate the semantic zoom command 306.

The content component 308 may be configured to obtain a set of related content 312 corresponding to the query "concerts in Las Vegas" and/or one or more search results associated with the main search engine results view 302 (e.g., a search result corresponding to a Vegas music festival website). The set of related content 312 may comprise various types of content, such as images, query suggestions, videos, maps, website links, application shortcuts, and/or other content obtained from a various content sources 310. The content component 308 may be configured to transition the search interface 301 from the main search engine results view 302 to the related content view 314. The content component 308 may populate the related content view 314 with a first portion of the set of related content 312. For example, the content component 308 may populate the related content view 314 with a first related content 316 (e.g., a narrowing query that adds the term "pop" to the query "concerts in Las Vegas), a second related content 318 (e.g., a narrowing query that adds the terms "during music festival" to the query "concerts in Las Vegas"), a third related content 320 (e.g., a shortcut link to a ticket purchasing application), a fourth related content 322 (e.g., a music video preview), a fifth related content 324 (e.g., a musical image), a sixth related content 326 (e.g., a broadening or side-ways query "things to do in Nevada"), and/or additional related content. In this way, the user may discover new content through the related content view 314. It may be appreciate that at least some of the content of the main search engine results view 302 (e.g., at least some of the portion of a set of search results comprised within the main search engine results view 302) may be displayed within the related content view 314.

Figure 4:
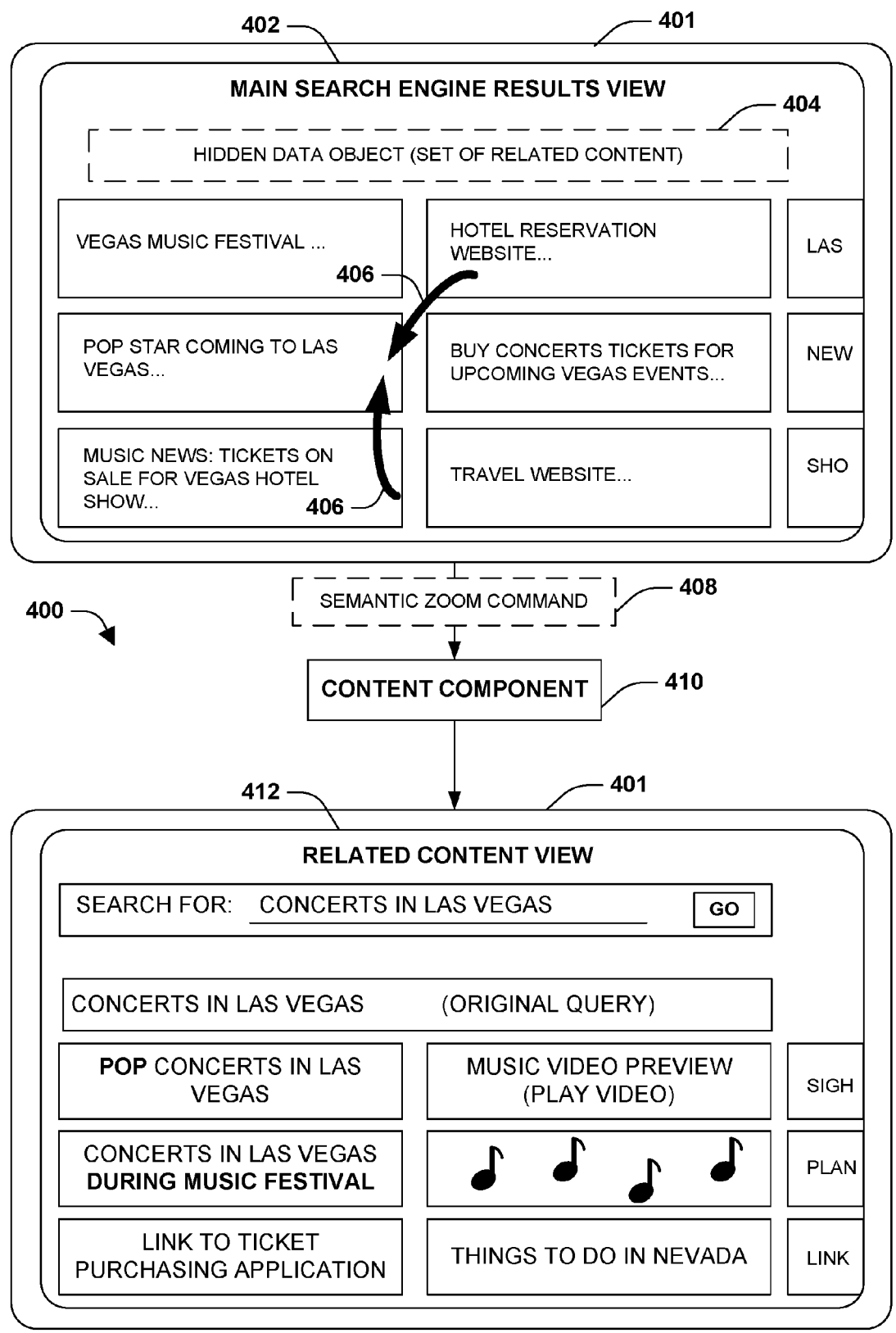
FIG. 4 is a component block diagram illustrating an exemplary system for displaying a related content view within a search interface based upon a set of related content stored within a hidden data object of a main search engine results view of the search interface.

FIG. 4 illustrates an example of a system 400 configured for displaying a related content view 412 within a search interface 401 based upon a set of related content stored within a hidden data object 404 of a main search engine results view 402 of the search interface 401. The system 400 may comprise a content component 410. The content component 410 may be associated with the search interface 401 (e.g., a search application). A main search engine results view 402 may be displayed within the search interface based upon a query "concerts in Las Vegas" submitted by a user of the search interface. In one example, the main search engine results view 402 comprises one or more search results from a set of search results corresponding to the query "concerts in Las Vegas". The content component 410 may be configured to detect a semantic zoom command 408 (e.g., corresponding to a touch event 406) associated with the main search engine results view 402. In one example, before the semantic zoom command 408 is received (e.g., before the main search engine results view 402 is displayed through the search interface), a set of related content corresponding to the query "concerts in Las Vegas" and/or a query result from at least some of the set of search results may be retrieved. The set of related content may be stored within a hidden data object 404 comprised within the main search engine results view 402. In this way, the set of related content may be available to the content component 410 for display within the related content view 412. For example, responsive to the semantic zoom command 408, the content component 410 may display the related content view 412 comprising one or more related content from the set of related content stored within the hidden data object 404.

Figure 5:
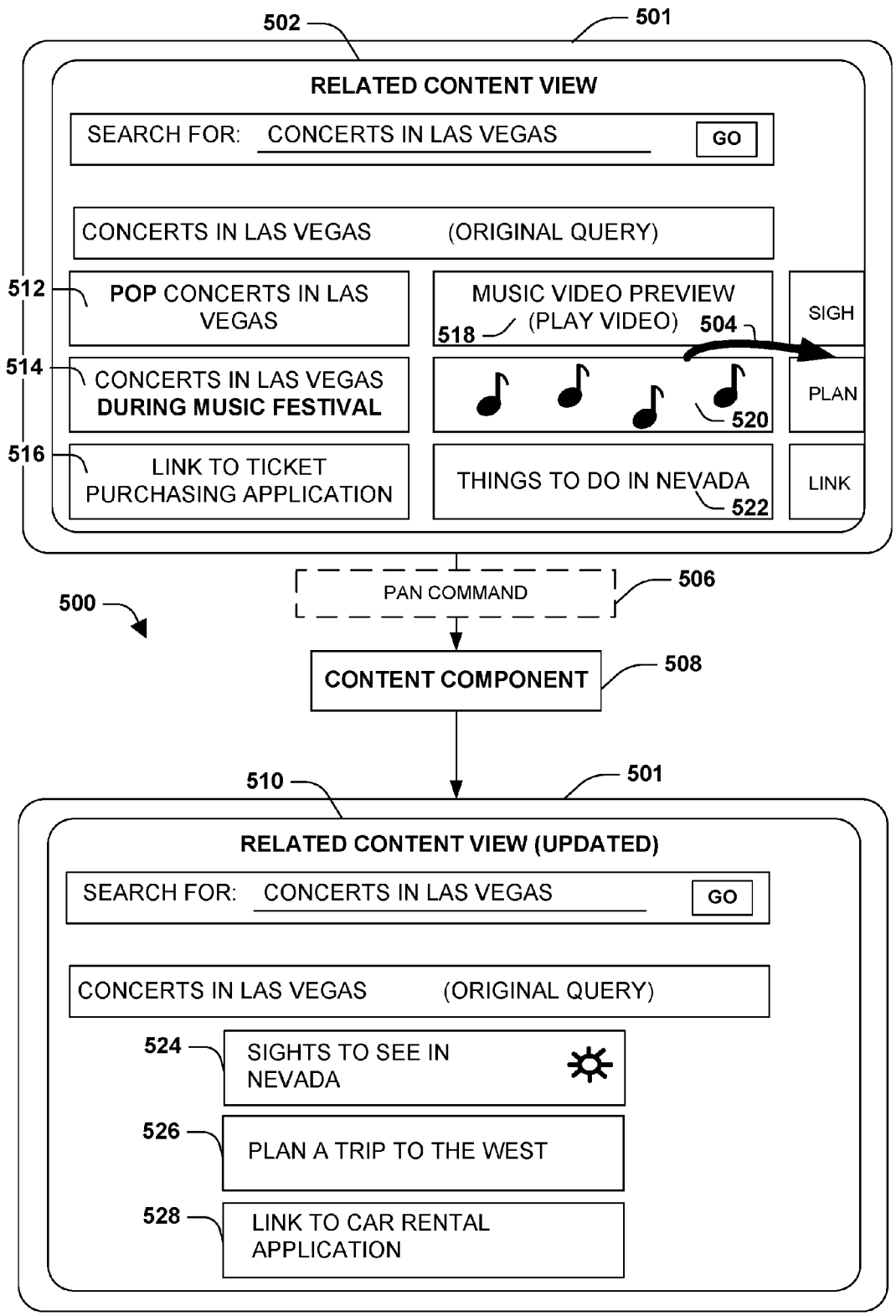
FIG. 5 is a component block diagram illustrating an exemplary system for performing a pan command associated with a related content view.

FIG. 5 illustrates an example of a system 500 configured for performing a pan command 506 associated with a related content view 502. The system 500 may comprise a content component 508. The content component 508 may be associated with a search interface 501. The search interface 501 may comprise the related content view 502 comprising a first portion of a set of related content (e.g., a first related content 512, a second related content 514, a third related content 516, a fourth related content 518, a fifth related content 520, and/or a sixth related content 522, etc.).

The content component 508 may be configured to receive the pan command 506 associated with the related content view 502. For example, a user may perform a touch gesture, such as a swipe 504, on a screen of a touch device to initiate the pan command 506. The content component 508 may be configured to remove the first portion of the set of related content from the related content view 502, and display a second portion of the set of related content within the related content view (e.g., updated related content view 510) based upon the pan command 506. For example, the content component 508 may populate the related content view (e.g., updated related content view 510) with a seventh related content 524 (e.g., a link to a sightseeing website with an image of a sun), an eighth related content 526 (e.g., a suggested query "plan a trip to the west"), a ninth related content 528 (e.g., a shortcut link to a car rental application), and/or other related content. In this way, the user may pan through related content within the related content view.

Figure 6:
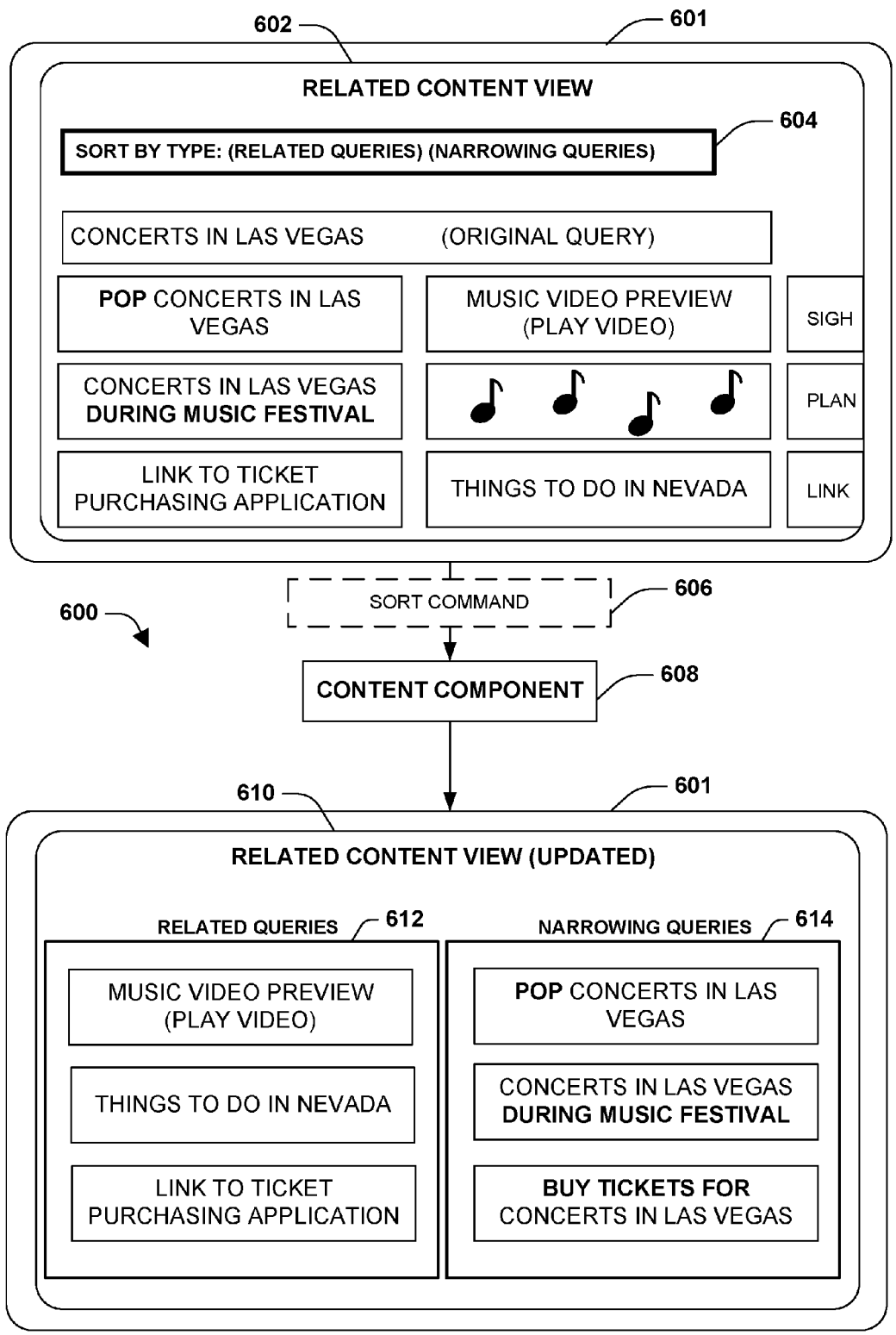
FIG. 6 is a component block diagram illustrating an exemplary system for performing a sort command associated with a related content view.

FIG. 6 illustrates an example of a system 600 configured for performing a sort command 606 associated with a related content view 602. The system 600 may comprise a content component 608. The content component 608 may be associated with a search interface 601. The search interface 601 may comprise the related content view 602 comprising a first portion of a set of related content. The content component 608 may be configured to receive the sort command 606 associated with the related content view 602. For example, a user may invoke a sort by type functionality 604 to sort the set of related content based upon related query and narrowing query types. Based upon the sort command 606, the content component 608 may sort the set of related content into a grouping of related queries and a grouping of narrowing queries. The content component 608 may display, within the related content view (e.g., updated related content view 610), one or more related queries 612 from the grouping of related queries and/or one or more narrowing queries 614 from the grouping of narrowing queries. In this way, the user may sort, group, organize, and/or display related content based upon various sort criteria, such as sort by type, sort by popularity, sort by category, sort by date, etc.

Figure 7:
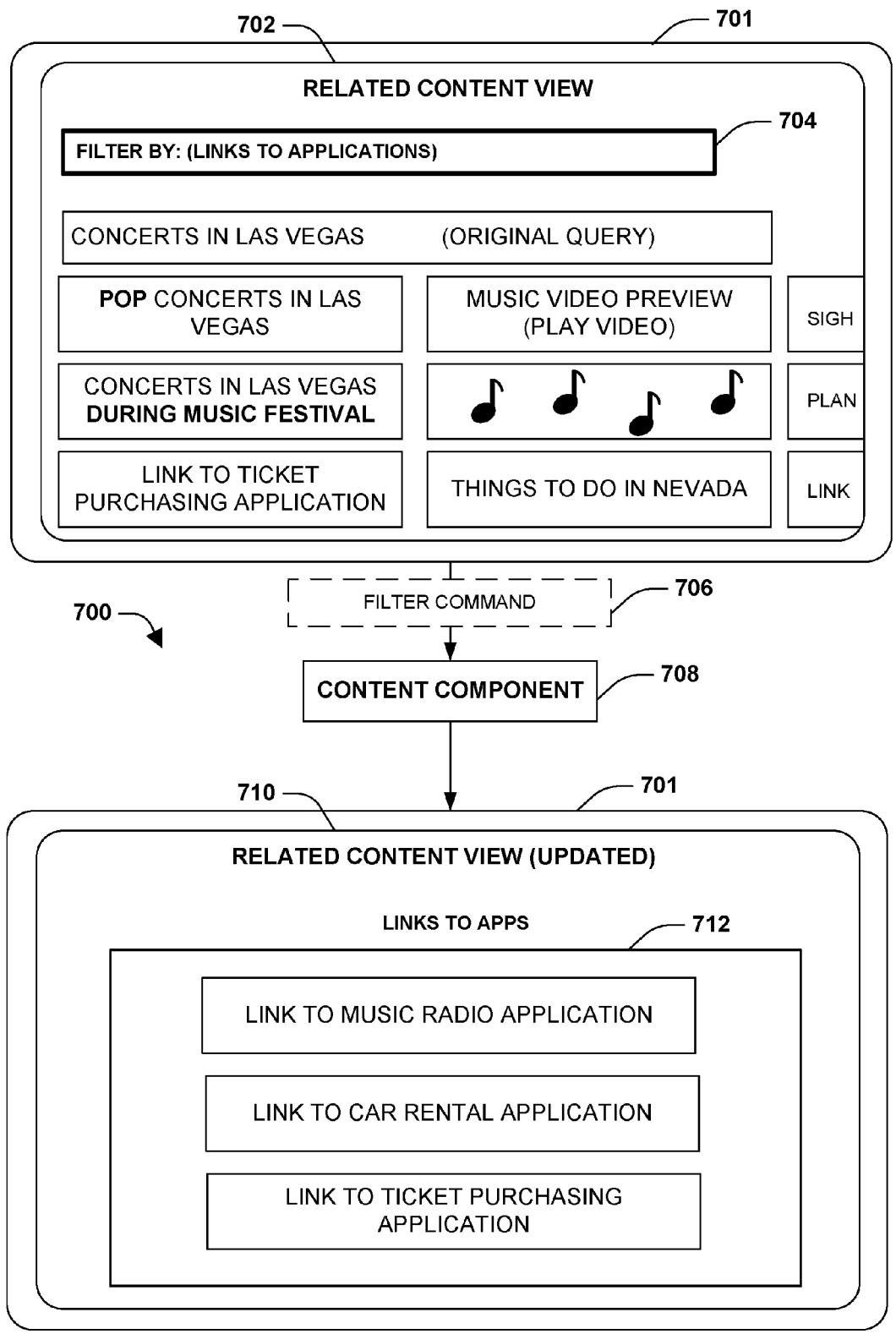
FIG. 7 is a component block diagram illustrating an exemplary system for performing a filter command associated with a related content view.

FIG. 7 illustrates an example of a system 700 configured for performing a filter command 706 associated with a related content view 702. The system 700 may comprise a content component 708. The content component 708 may be associated with a search interface 701. The search interface 701 may comprise the related content view 702 comprising a first portion of a set of related content. The content component 708 may be configured to receive the filter command 706 associated with the related content view 702. For example, a user may invoke a filter by type functionality 704 to filter the set of related content by links to applications. Based upon the filter command 706, the content component 708 may filter the set of related content into a grouping of links to applications. The content component 708 may display one or more links to applications 712 from the grouping of links to applications within the related content view (e.g., updated related content view 710). In this way, the user may filter, group, organize, and/or display related content based upon various filters, such as keywords, for example.

Figure 8:
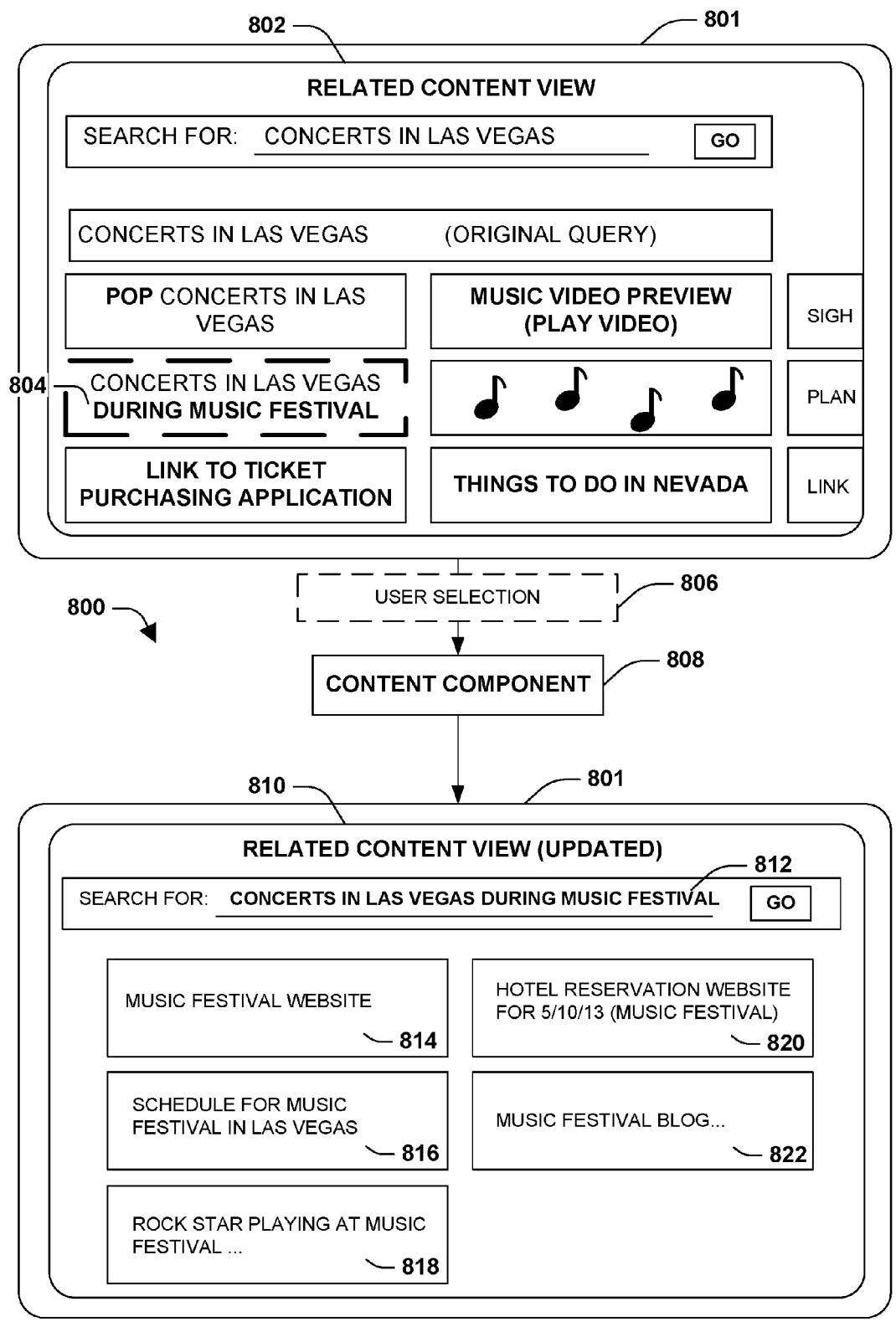
FIG. 8 is a component block diagram illustrating an exemplary system for performing functionality associated with a user selection of related content within a related content view.

FIG. 8 illustrates an example of a system 800 configured for performing functionality associated with a user selection 806 of related content within a related content view 802. The system 800 may comprise a content component 808. The content component 808 may be associated with a search interface 801. The search interface 801 may comprise the related content view 802 comprising a first portion of a set of related content. The content component 808 may be configured to receive the user selection 806 associated with the related content view 802. For example, a user may select related content 804 comprising a narrowing query "concerts in Las Vegas during music festival" (e.g., that narrows a previous query "concerts in Las Vegas"). Based upon the user selection 806, the content component 808 may retrieve a set of related search results that are relevant to the narrowing query "concerts in Las Vegas during music festival" 812. In one example, the content component 808 may populate the related content view (e.g., updated related content view 810) with at least a portion of the set of related search results, such as a first related search result 814, a second related search result 816, a third related search result 818, a fourth related search result 820, a fifth related search result 822 and/or other related search result(s). In another example, the content component 808 may transition the search interface 801 from the related content view 802 to a main search engine results view, and may populate the main search engine results view with at least a portion of the set of related search results. In this way, the user may further explore content by selecting related content within the related content view 802 and/or the main search engine results view.

Figure 9:
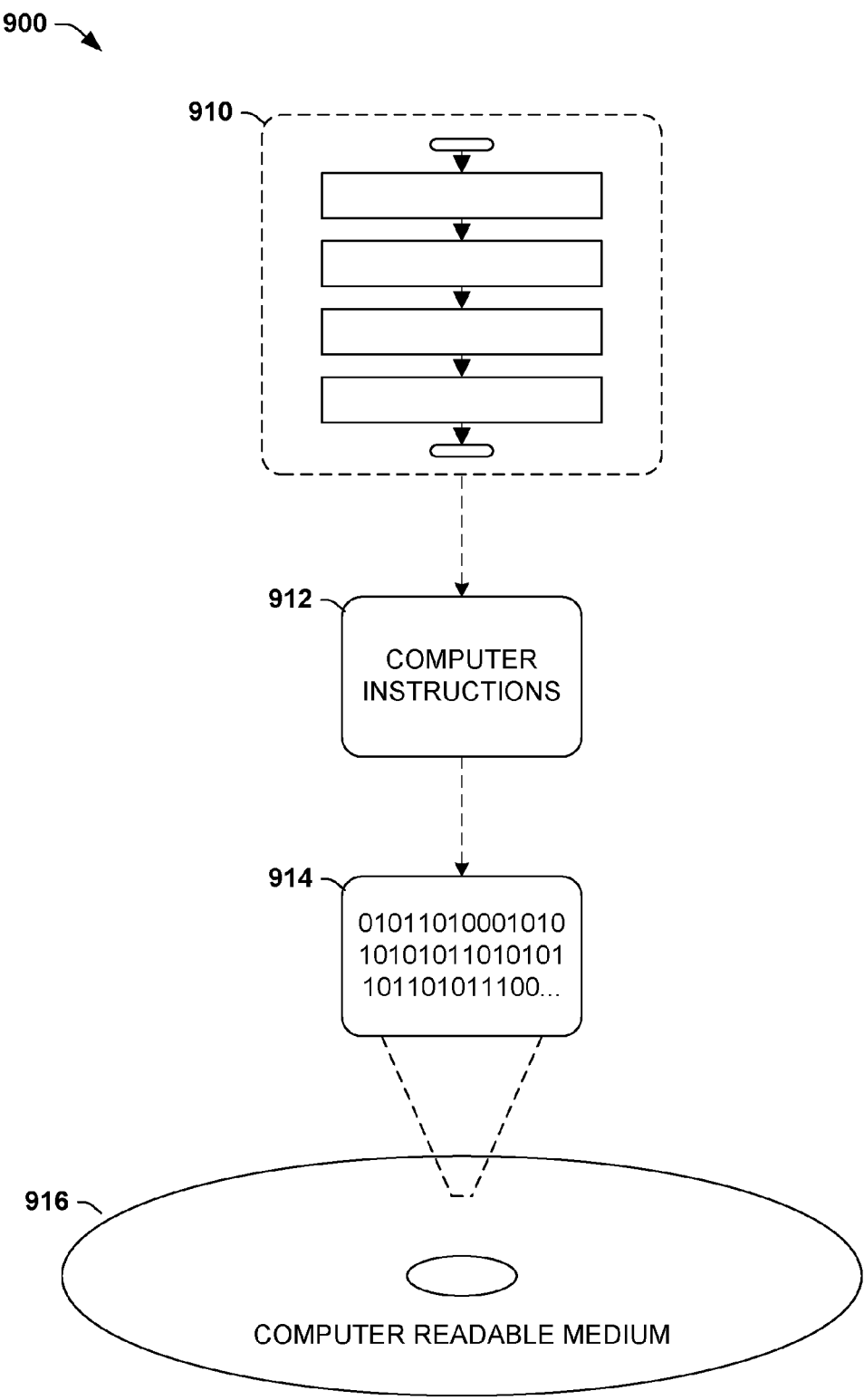
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 900, the processor-executable computer instructions 912 may be configured to perform a method 910, such as at least some of the exemplary method 100 of FIG. 1, for example. In another such embodiment, the processor-executable instructions 912 may be configured to implement a system, such as, at least some of the exemplary system 200 of FIG. 2, at least some of the exemplary system 300 of FIG. 3, at least some of exemplary system 400 of FIG. 4, at least some of the exemplary system 500 of FIG. 5, at least some of the exemplary system 600 of FIG. 6, at least some of the exemplary system 700 of FIG. 7, and/or at least some of the exemplary system 800 of FIG. 8, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
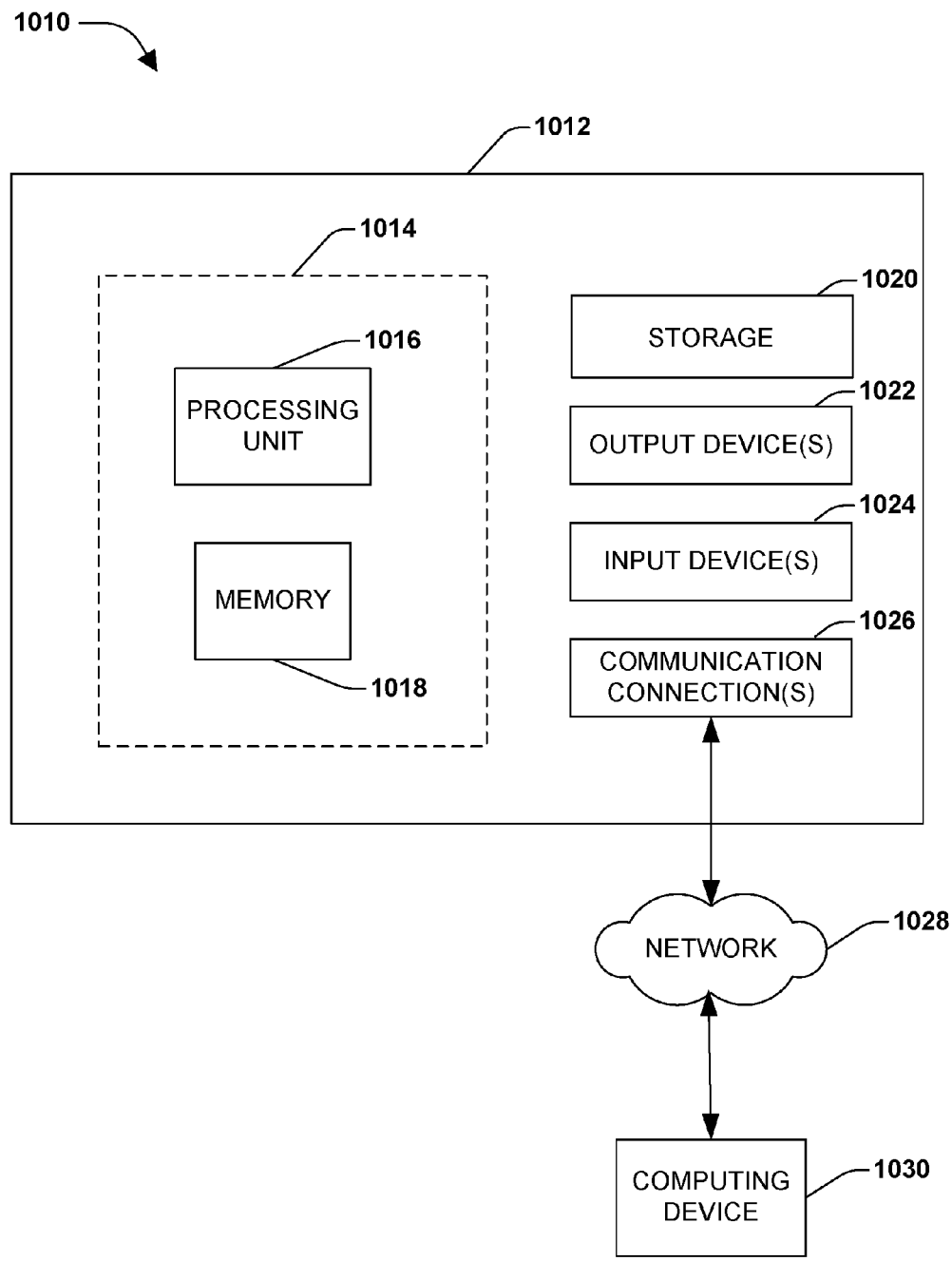
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer method comprising:
   receiving a search query;
   responsive to receiving the query:
     obtaining a set of search results corresponding to the query; and
     displaying at least a portion of the set of search results within a main search engine results view;
     obtaining a set of related content corresponding to the query, the set of related content determined by narrowing the query;
   receiving a semantic zoom command associated with the main search engine results view; and
   in response to receiving the semantic zoom command, transitioning the search interface from the main search engine results view to a related content view.

2. The method of claim 1, the obtaining a set of related content comprising:
   obtaining the link to the application.

3. The method of claim 1, the obtaining a set of related content comprising:
   obtaining the image.

4. The method of claim 1, the obtaining a set of related content comprising:
   obtaining the video.

5. The method of claim 1, the obtaining a set of related content comprising:
   obtaining a coupon.

6. The method of claim 1, the obtaining a set of related content comprising:
   obtaining the map direction.

7. The method of claim 1, the obtaining a set of related content comprising:
   obtaining the map.

8. The method of claim 1, further comprising:
   receiving the query through a search application comprising the search interface.

9. The method of claim 1, further comprising:
   responsive to receiving a filter command, filtering the first portion of the set of related content based upon a filter criterion.

10. A system comprising a processor in electronic communication with computer-readable storage media, the computer readable-storage media storing instructions that, when executed, perform a method, the method comprising:
    receiving a search query;
    responsive to receiving the query:
      obtaining a set of search results corresponding to the query; and
      displaying at least a portion of the set of search results within a main search engine results view;

obtaining a set of related content corresponding to the query, the set of related content determined by narrowing the query;

receiving a semantic zoom command associated with the main search engine results view; and in response to receiving the semantic zoom command, transitioning the search interface from the main search engine results view to a related content view.

11. The system of claim 10, the obtaining a set of related content comprising:

obtaining the link to the application.

12. The system of claim 10, the obtaining a set of related content comprising:

obtaining the image.

13. The system of claim 10, the obtaining a set of related content comprising:

obtaining the video.

14. The system of claim 10, further comprising:

receiving the query through a search application comprising the search interface.

15. The system of claim 10, further comprising:

responsive to receiving a filter command, filtering the first portion of the set of related content based upon a filter criterion.

16. A computer readable-storage device storing instructions that, when executed, perform a method, the method comprising:

receiving a search query;

responsive to receiving the query:

obtaining a set of search results corresponding to the query; and displaying at least a portion of the set of search results within a main search engine results view;

obtaining a set of related content corresponding to the query, the set of related content determined by narrowing the query;

receiving a semantic zoom command associated with the main search engine results view; and in response to receiving the semantic zoom command, transitioning the search interface from the main search engine results view to a related content view.

17. The computer readable-storage device of claim 16, the obtaining a set of related content comprising:

obtaining the link to the application.

18. The computer readable-storage device of claim 16, the obtaining a set of related content comprising:

obtaining the image.

19. The computer readable-storage device of claim 16, the obtaining a set of related content comprising:

obtaining the video.

20. The computer readable-storage device of claim 16, further comprising:

receiving the query through a search application comprising the search interface.

* * * * *